Dec. 16, 1969     D. W. TOWNSEND     3,484,134

SEAT BELT SYSTEM AND ARRESTER

Filed Nov. 14, 1967     3 Sheets-Sheet 1

INVENTOR
DOUGLAS W. TOWNSEND
BY
*Jack Larsen*

ATTORNEY

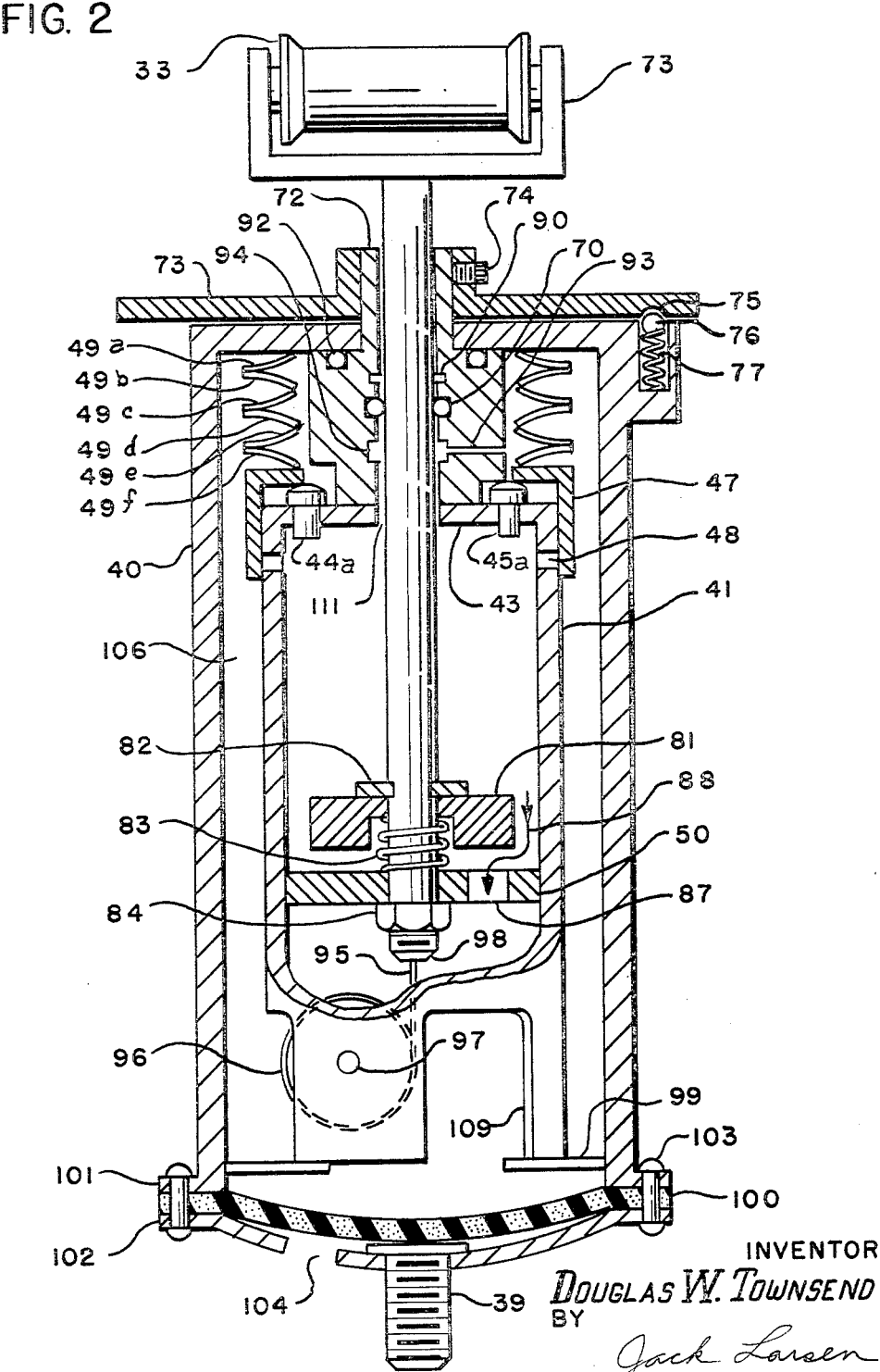

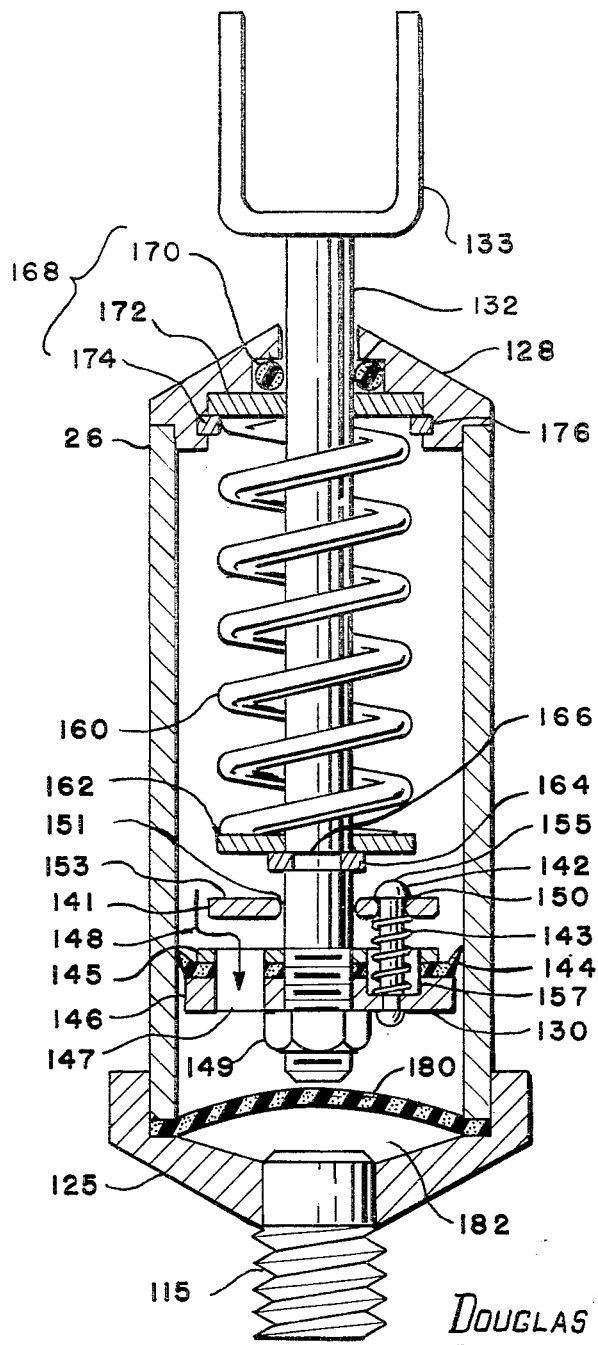

United States Patent Office 3,484,134
Patented Dec. 16, 1969

3,484,134
SEAT BELT SYSTEM AND ARRESTER
Douglas William Townsend, 72 Springbrook Drive,
Peterborough, Ontario, Canada
Continuation-in-part of application Ser. No. 576,266,
Aug. 31, 1966. This application Nov. 14, 1967, Ser.
No. 682,938
Int. Cl. B60r 21/10; A62b 35/00
U.S. Cl. 297—386
9 Claims

ABSTRACT OF THE DISCLOSURE

A safety-belt system for automobiles and the like is shown wherein a hydraulic snubber interconnects the shoulder-type harness and the vehicle frame so that substantially unrestrained body motion is permitted to adjust controls, etc. yet almost instantaneous and firm restraint is applied when a potentially dangerous combination of acceleration and velocity of occupant relative to the structure is indicated by relative motion. The present system is distinguished by an abruptly increased and relatively constant force lever and by means for adjusting the restraining force to the body weight of an occupant. A valve spring-loaded in the open condition is abruptly closed to increase the force level for restraint, while a further spring-loaded valve relieves internal pressure, and hence restraining force at a predetermined safe level depending on body weight.

---

This application is a continuation-in-part of my copending application Ser. No. 576,266 filed Aug. 31, 1966 and about to be abandoned.

This invention relates to safety belts for automotive vehicles and more particularly to an improved arresting system for belts of the shoulder-harness type. It also provides for a means whereby the kinetic energy of the passenger may be absorbed by a snubber and the vehicle.

It is well known that many of the serious injuries in automobile collisions result from the so-called "second collision." This is the impact of the driver or passengers with the steering wheel, dashboard or other parts of the passenger compartment. It is recognized that the use of seat belts can greatly reduce the incidence of such injuries and reduce their severity. It is further well known that a shoulder harness type of belt, if worn, is much more effective in this regard than is the more commonly used lap strap. The trouble with prior art shoulder harness fixed rigidly to the vehicle has been that passengers too often do not use them when installed and if used they are worn too loosely and in a collision they commonly display poor yielding characteristics.

To tune a radio, pay a toll, or back the vehicle, a fixed shoulder belt must be released. Too often it is not refastened. Solidly fastened shoulder belts are difficult to wear on a long trip as they confine a person to one position without permitting normal stretching to relieve cramped muscles. Hence such belts may contribute to driver fatigue and to the incidence of accidents. During an accident such belts absorb only a fraction of the energy that could be absorbed if the maximum permissible force were exerted for the whole of the available stopping distance. Belts which are unyielding to normal passenger movements are usually worn with several inches of slack. During an accident vital time and stopping room is lost while the passenger moves forward to stretch the belt. Since kinetic energy can only be absorbed by moving against a force through a displacement very little kinetic energy can be transmitted to the vehicle by such belts. They are able to absorb small amounts of energy by stretching 15% to 25% of their length. The amount of energy absorbed is small, because much of this stretching occurs at low forces. Moreover, springback results from about 25% of the energy input into such belts being stored as elastic energy which is released after the passenger stops moving forward and causes him to be thrown back in the seat at velocities which have been recorded to be as high as 10 miles per hour. More seriously such belts are often broken by peak forces resulting from vehicles crashing from as little as 30 miles per hour velocity. A stronger fixed belt would also have to be made wider so as not to exert more local pressure on the passenger than the body can withstand without serious injury. Wider, heavier belts would be even less comfortable to wear.

It is the general object of this invention to provide an improved belt system which overcomes the above faults. It is a further object to provide an improved mechanism which is small and relatively simple in construction and reliable in operation.

A feature of this invention is a hydraulic snubber somewhat similar to arrestors for safety belts described in U.S. Patents 2,649,145, Aug. 18, 1953, to L. O. McCarthy and 2,680,476, June 8, 1954, to J. L. Saffell. It is to be distinguished in one respect in that it provides less resistance to forward motion of the passenger at slow speeds but abruptly higher forces for rapid motion as in a crash. In this it is similar to the apparatus disclosed in L. F. Bayer Patent 3,371,960 issued Mar. 5, 1968. A further new feature of the present invention is that the snubber eliminates peak loads on the harness in excess of a predetermined limit by yielding under the predetermined constant force. A further novel feature is that the limit force may be adjusted for different individual occupants.

The invention accordingly comprises the features of construction, combinations of elements and arrangements of parts which will be exemplified in the constructions hereinafter set forth.

For a fuller understanding of the nature and objects of the invention reference should be had to the following description taken in connection with the accompanying drawings in which:

FIG. 2 is an enlarged view in vertical section of the snubber mechanism;

FIG. 6 is a view in vertical section of an alternative embodiment of a snubber.

Figure 1:
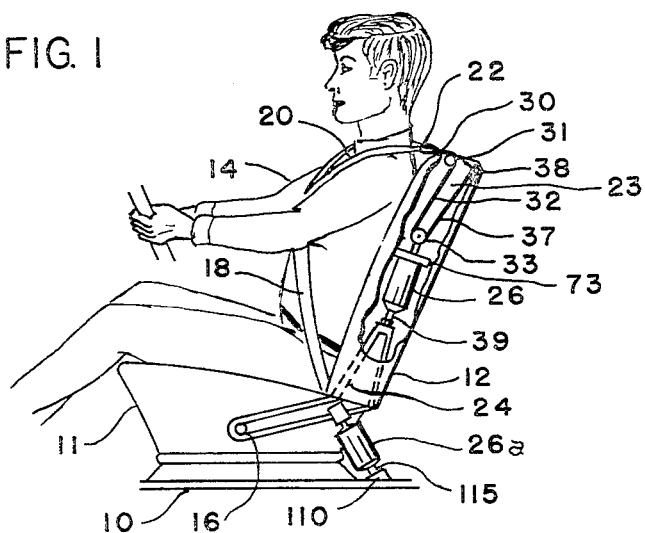
FIG. 1 is a cut-away view in vertical section of a seat equipped with a mechanism embodying the invention.
Figure 3:
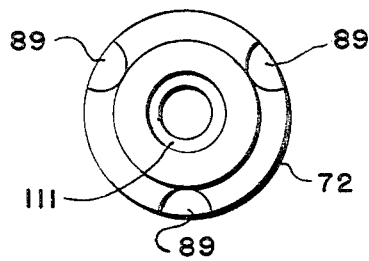
FIG. 3 is an enlarged bottom view of the spacer which separates the inner and outer cylinders.

The mechanism shown in FIG. 1 includes a seat 10, comprised of a cushion portion 11 and a backrest 12 to accommodate an occupant in the position indicated at 14. The occupant is provided with a shoulder harness having straps 18 secured to the seat at either side and straps 20 which pass over the occupant's shoulders. These straps join at a Y, 22, to a restraining strap 23 which transmits force to an anchor member 24 through a snubber 26. From the Y 22 there is a horizontal reach 30. Then the strap 23 is carried over a smooth metal bar or sheave 31 fixed in the backrest 12 and turns downward in a reach 32 between bar 31 and a sheave 33 and ends in an upward reach 37 to a seat member 38 to which the end is clamped.

Within the backrest 12 is a structural member 24 to which the bolt 39 is fastened which supports the tube 40 which encases the hydraulic cylinder 41 having a head 43 containing two sets 44a, b, c and 45a, b, c of actuating pistons, only one set at a time of which bear against a relief valve 47 which gates ports 48 in the cylinder 41 and is supported by the springs 49a, f. Within the cylinder 41 is a piston 50 fixed at the lower end of a piston rod 52 which passes through the cylinder head 43, an oil seal 70 which is held in a spacer 72 which is bushed in the upper end of the tube 40 to be turned by a handwheel 73 to which it is fixed by a fastener 74. To control the positions of the handwheel 73 and the spacer 72, detent notches 75 in the handwheel are engaged by a detent ball 76 backed by a spring 77 comprising a detent mechanism. The rod 52 terminates in a yoke 78 which carries the sheave 33.

The mechanism which locks a volume of fluid in the upper, or high pressure end of the inner cylinder 41 when the belt is jerked comprises the piston 50, a valve 81, a retaining ring 82 and a valve spring 83. The piston assembly is retained by the nut 84.

Figure 5:
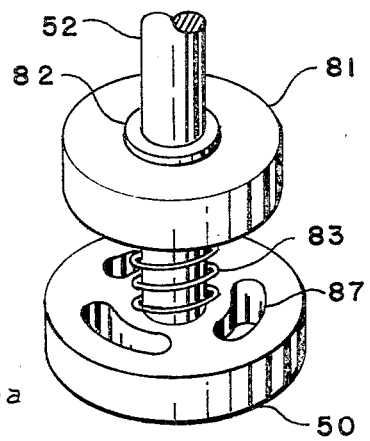
FIG. 5 is a perspective drawing of the piston and valve mechanism which locks the fluid in the inner cylinder.
Figure 4:
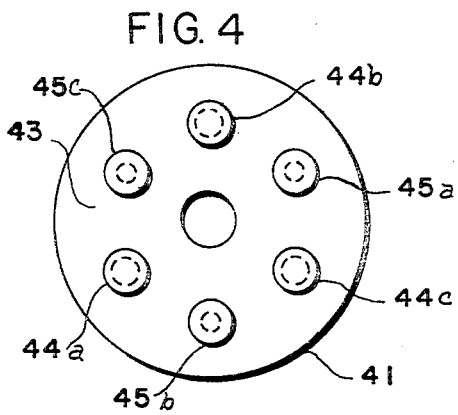
FIG. 4 is a top view of the inner cylinder showing two differing sets of actuating pistons in position.

The piston 50 is cut away in three or four places to provide generous passages 87 for the fluid to flow between the upper volume of fluid and the remaining volume as indicated by the arrow 88 when the valve 81 is in the open position as shown in FIG. 2 and FIG. 5. The valve 81 is normally held away from the passages 87 by the valve spring 83. The valve is guided and the valve spring retained by the piston rod 52. Sliding clearance between the valve and the piston rod allows the valve 81 to slide smoothly up and down when forced by fluid pressure, its own inertia, and the valve spring force. The force of the valve spring 83 is sufficient to hold the valve away from the passages 87 against the force resulting from the friction of the fluid flowing around the valve when the piston is moved upward at velocities of two to four feet per second. The valve will close however whenever the upward piston velocity exceeds two to four feet per second and the force resulting from the friction of the fluid flowing around the valve 81 and through the holes 87 exceeds the force exerted by the spring 83. The closing of this valve is very rapid. As soon as the valve moves away from the retaining ring 82 the space between the valve and the piston is restricted which increases the fluid friction and the force tending to close the valve. This closing movement normally continues until the passages 87 are completely blocked off by the valve. The piston and valve then completely blocks off the cylinder 40 and traps a volume of fluid in the top of the cylinder.

When the piston is rapidly jerked upward as may occur during a vehicle accident, the inertia of the valve 81 is sufficient to cause it to lag behind the retaining ring 82 and assist fluid friction in closing the passages 87 before fluid friction alone could cause this to occur. This can save important time and stopping distance both between the occupant and the vehicle interior and, the vehicle interior and the part of the vehicle being deformed. This distance is displacement through which work can be done to use up the kinetic energy of the occupant and bring him to rest while exerting relatively low forces on his body.

The relief valve mechanism consists of the sliding sleeve valve 47, the ports 48 either the actuating pistons 44a, b, c or 45a, b, c, the spacer 72 and the springs 49a, f. When the snubber is adjusted as shown in FIG. 2 the pistons 44a, b, c bear against the sleeve valve 47 while the pistons 45a, b, c bear against the spacer 72 and are thereby fixed and unable to influence the movement of the sleeve valve 47. The valve is opened whenever fluid pressure in the high pressure end of the cylinder 41 pushing up on the circular cross-sections of the pistons 44a, b, c overcomes the force of the springs 49a, b. The valve 47 slides up the cylinder 41 exposing the ports which encompass most of the circumference of the cylinder 41 except for webs required for strength. The fluid can then rush out of the ports 48 to regulate the pressure. The net result is that the piston moves through a distance against a force and absorbs energy. By carefully choosing the spring rate to be progressive, zero or regressive any desired velocity-versus-force characteristics can be imparted to the piston. It appears at this time that the most desirable seat belt would be one that yields at relatively constant force. This is accomplished by mating it to a snubber wherein the relief valve, as shown, is governed by constant-force Belleville springs prestressed in about one-third their flat displacement.

The relief valve shown in FIG. 2 can be adjusted to relieve at second quite different pressure by simply rotating the hand wheel 73 which turns the spacer 72 until the actuating pistons 45a, b, c, are directly under the notches 89 and are free to bear on the relief valve 47. The area of the pistons 45a, b, c, is less than the area of the pistons 44a, b, c, thereby establishing a higher force level before relieving. If more sets of actuating pistons were provided with different cross-sectional areas, the relief valve would relieve pressure at a different pressure for each such further set of three actuating pistons. It is important that at least one set of pistons be operable and that the spacer not be left in a position intermediate between operable positions. To assure this, the force of the detent spring should be sufficient so that the detent mechanism cannot stay between stops.

Thus a child or a heavy adult could be brought to rest at the same deceleration by the same seat belt but with the snubber adjusted to select the proper set of actuating pistons to bear against the relief valve 47. For a light person the snubber would be set to yield at less force and absorb less energy than for a heavy person; but less energy needs to be absorbed and transmitted to the vehicle. About the same amount of displacement of the person with respect to the vehicle would occur in each case.

To reduce the friction of the O-ring seal 70 against the piston rod 52 when the rod moves downward, a small quantity of grease is retained above the seal 70 in the groove 90 in the spacer 72. The leakage of fluid around the spacer where it is bushed in the upper end of the tube 40 is prevented by a second O-ring seal 92. A vent 93 to a groove 94 in the spacer 72 prevents the build-up of high oil pressure from the inner cylinder against the seal 70, thereby reducing leakage and wear and allows any air trapped in the inner cylinder to easily work its way out. A spring 95 wound on the drum 96 which pivots on the shaft 97 through the inner cylinder 41 tugs against the end 98 of the piston rod 52 and tends to pull it down into the cylinder thereby applying tension to the shoulder belts 20 to keep them snug whether the occupant leans forward or is at rest. The tape-like spring 95 applies a constant force no matter how far extended by reason of having been pre-set to the diameter of a drum smaller than the drum 96.

A ring 99 fastened to the outer cylinder 40 and the inner cylinder 41 prevents one from turning within the other but allows for some longitudinal compliance whereby the spacer 72, although fitting closely, remains free to turn. The normal force exerted against the cylinder 41 opposes the force of the springs 49a–f which tends to push the cylinder away from the spacer 72.

A rubber membrane 100 holds the hydraulic fluid in the snubber and allows the piston rod to be pulled from the cylinders as when the person moves forward without a large change in absolute pressure within the cylinders. The atmospheric pressure pushes the membrane in and allows the fluid to occupy the volume of the rod 52 so that it may be easily pulled out.

The membrane 100 extending across the bottom of the cylinder is squeezed at its perimeter between the base flange 101 of the cylinder 40 and an end-bell 102 by a plurality of rivets 103. The end bell 102 which is continuous except for a vent 104 carries the restraining force from the tube 40 through the rivets 103 to the bolt 39 which anchors the snubber to the seat 12. Fluid released through the ports 48 is returned to the low-pressure end of the cylinder 41 by a conduit comprising the annulus 106 between the cylinders 40 and 41 and the openings 109 at the lower end of the cylinder 41.

In use, the cylinder is maintained full of hydraulic fluid and under slight pressure. Any gas bubbles would tend to reach the reservoir 111 and work out through the vent 93.

In FIG. 1, a second cylinder 26a is shown by which the backrest 12 is fastened to a rigid point of attachment 110. Cylinder 26a is of the same general construction and function as cylinder 26. It allows the seat to be slowly tilted forward to provide access to a rear seat, but locks when excessive rates are encountered. Because the operative rates and force levels appropriate for the cylinder 26a may be different than for a cylinder exerting force directly on the occupant, it may not be identcial in the proportions of the parts, as is well known in the art.

FIG. 6 shows the arrangement of a simplified alternative snubber without over-pressure relief which may be employed as the snubber 26a and with other excess force relieving means (such as tear-out fastenings, stretchable-straps) to restrain the body harness.

The snubber 26a having a cylindrical body 112 fastens at its lower end to the point 110 by a stud 115 set in an end bell 125. At the other end, the cylinder is closed by a head 128. Within the cylinder is the operating piston 130 connected by a piston rod 132 which passes through the head 128 and a clevis 133 to the back rest 12.

The piston 130 is made up of a valve plate 141, three shouldered rivets, 142, three valve springs, 143, a cup packing 144, an inner cup packing spacer 145, and a body 146.

The spacer, 145, body 146, and pump washer 144 are all cut away at three places to provide generous passages 147 for liquid to flow as indicated by the arrow 148 in the open position of the valve as shown. The cup packing 144 is squeezed between the body and the spacer by the nut 149 which retains these pieces to the piston rod 132. The valve plate 141 is normally held away from the passages 147 by the springs 143. The plate is guided and the springs retained by the rivets 142. Sliding clearance and rounded shoulders on the rivet holes 150 and piston rod hole 151 allow the plate to ride smoothly up and down when forced by fluid and spring pressure. A sudden upward movement of the piston rod causes a rise in pressure above the plate 141 and causes it to lag behind and be approached by the spaced 145. This movement restricts the passages 147, further increasing the differential pressure, and the relative motion between plate 141 and spacer 145 ordinarily continues until imperforate portions 153 of the plate completely close the passages 147. At the same time the packing 144 expands and stops any flow around it. By this action, the motion of the piston 130 is rapidly stopped until tension is removed from the rod 132.

The circumferential clearance around the plate 141 and the size of the passages 147 are made sufficient to allow free flow of fluid with a piston speed up to a predetermined value. At the critical speed, the resistance to flow around the plate 141 becomes perceptible. This force against the plate 141 overcomes the compliance of the springs 143 and the plate begins to separate from the rivet heads 155. This motion as described above restricts the flow, and increases the force. The increased force is sufficient substantially to balance or to overcome the increased resistance of the springs 143. The recess 157 in the body and the thickness of the washer 144 and spacer 145 provide sufficient space for the springs in their compressed condition, to avoid an excessive rise in spring force. The valve, therefore, closes completely before dangerous relative velocity between occupant and vehicle can build up, and before more than a fraction of an inch of the vital margin of safety is used up.

A weak spring 160 presses downward on the rod 132, being retained by a plain washer 162 and a spring clip 164 resting in a groove 166. The space above the piston is kept full of fluid, except for a possible small air bubble that may from time to time form at the head 128 of the cylinder near the seal 168. The seal comprises an O ring 170, a retaining washer 172 and a spring clip 174 which seats in groove 176 to hold the ring 170 and washer 172 in place.

The rubber dam 180 across the base of the cylinder encloses a bubble 182 of air, which under normal conditions with the rod 132 fully retracted exerts a small positive pressure against the liquid. This pressure is sufficient to seat the "O" ring upward.

When the backrest tilts forward and the piston 130 and piston rod 132 are carried upward, the fluid volume within the cylinder is increased by the decreased displacement of the rod. Without thea ir bubble 182 the partial vacuum created as the rod 132 is withdrawn would exert a substantial restraining force. With the volume of the bubble 182 selected to be equal to, or somewhat greater than the volume of the rod 132, this effect is greatly reduced. The internal pressure drops below atmospheric only slightly and then only at extreme extensions of the rod. Under these conditions, the O ring 170 when worn or dirty, may admit a small quantity of air to the top of the cylinder. On retraction of the rod to its normal position under the resulting positive pressure any such air taken in would tend to leak out, while the seal would be essentially perfect in retaining liquid, which has much higher density, viscosity, and surface tension.

It will thus be seen that the objects set forth above, among those made apparent from the preceding description, are efficiently attained. Since certain changes may be made in carrying out the above process, in the described product and in the the constructions set forth departing from the scope of the invention, it is intended that all matter contained in the above description shall be interpreted as illustrative and not in a limiting sense.

The embodiments of this invention in which an exclusive property or privilege is claimed are defined as follows:

1. A snubber for restraining dangerous impacts between a vehicle and an occupant thereof comprising:
    (a) a hydraulic cylinder;
    (b) a supply of hydraulic liquid within said cylinder;
    (c) a piston within said cylinder, dividing said cylinder into a high-pressure volume at one end and a low pressure volume;
    (d) a check valve connected between said high-pressure volume and said low-pressure volume compliantly held in an open condition to allow said liquid to pass freely in both directions between said volumes but to block flow from said high-presshure volume to said low-pressure volume when the rate of flow exceeds a critical value,
    (e) a conduit interconnecting said high-pressure volume and said low-pressure volume,
    (f) a relief valve for controlling flow through said conduit, and
    (g) means for reversibly opening said relief valve responsive to pressure between said volumes in excess of a predetermined limit, and for closing said relief valve at a lower pressure.

2. A snubber as defined by claim 1,
    (h) wherein said conduit comprises an annulus between said hydraulic cylinder and a coaxial containing cylinder and
    (i) wherein said relief valve comprises,
        a port from said high-pressure volume into said annulus,
        a cylindrical sleeve slideably operable to uncover said port,
        a conical spring to urge said sleeve toward the closed position, and
        a control piston mounted in the head of said hydraulic cylinder at its high-pressure end to bear against an extension of said sleeve to urge it toward its open position.

3. A snubber as defined by claim 2, further comprising,
(j) a control piston of larger diameter than said other control piston mounted in said hydraulic cylinder head,
(k) a spacer moveable between a first position interfering with said larger piston and a second position interfering with said other piston, and,
(l) means to move said spacer to change said limit.

4. A snubber as defined by claim 1 wherein said check valve is part of said piston.

5. A seat belt system for restraining dangerous impacts between a vehicle and an occupant of a seat therein comprising:
(a) a snubber as defined by claim 1 fixed to an anchor member of said seat,
(b) a restraining harness connecting said occupant and said piston to move said piston toward said high-pressure end responsive to slow forward movement of said occupant relative to said seat.

6. A seat belt system for restraining dangerous impacts between a vehicle and an occupant of a seat therein comprising:
(a) a snubber as defined by claim 2 fixed to an anchor member of a said seat, and
b) a restraining harness connecting said occupant and said first-named piston to move said first-named piston toward said high-pressure end responsive to normal, safe slow forward movement of said occupant relative to said seat.

7. A seat belt system for restraining dangerous impacts between a vehicle and an occupant of a seat therein comprising:
(a) a snubber as defined by claim 3 fixed to an anchor member of said seat, and
(b) a restraining harness connecting said occupant and said first-named piston to move said first-named piston toward said high-pressure end responsive to normal, safe, slow forward movement of said occupant relative to said seat.

8. For use with an automobile front seat of the type comprising a cushion portion and a backrest hinged at its lower end to be tiltably connected to said cushion portion, a seat belt system for restraining dangerous impacts between said automobile and an occupant of said seat therein comprising:
(a) a snubber as defined by claim 1 fixed to an anchor member of said backrest,
(b) a restraining harness connecting said occupant and said piston to move said piston toward said high-pressure end responsive to slow forward movement of said occupant relative to said backrest, and
(c) a second snubber connected between said backrest and a point of attachment, said second snubber comprising,
a hydraulic cylinder,
a supply of hydraulic liquid within said cylinder,
a piston dividing said cylinder into a high pressure volume at one end and a low-pressure volume at its other end,
a check valve between said high-pressure volume and said low-pressure volume compliantly held open to allow said liquid to pass freely in both directions between said volumes but to block flow from said high pressure volume to said low pressure volume when the rate of flow exceeds a critical value, and
an elastomeric dam sealed across said low-pressure end to enclose a bubble of gas, 9. A snubber for a seat-belt system comprising:
(a) a hydraulic cylinder,
(b) a supply of hydraulic liquid within said cylinder,
(c) a piston within said cylinder, dividing said cylinder into a high-pressure volume and a low-pressure volume,
(d) a check valve through said piston compliantly held in an open condition to allow said liquid to pass freely in both directions between said volumes but to block flow from said high-pressure volume to said low-pressure volume when the rate of flow exceeds a critical value,
(e) a piston rod fixed to said piston and extending through the high-pressure end closure of said cylinder,
(f) a ring seal lubricated by said liquid, sealing the passage of said rod through said closure,
(g) an elastomeric dam sealed across said low-pressure end to enclose a gas bubble between said dam and the low-pressure end closure of said cylinder, and
(h) a spring within said high-pressure volume tending to urge said position toward said low-pressure end to maintain tension in said rod.

References Cited
UNITED STATES PATENTS

| | | | |
|---|---|---|---|
| 1,658,962 | 2/1928 | Aikens. | |
| 2,244,501 | 6/1941 | Pierce | 198—88 |
| 2,360,993 | 10/1944 | Whisler | 188—88 |
| 2,557,313 | 6/1951 | Quilter | 297—386 |
| 2,680,476 | 6/1954 | Saffell | 297—386 |
| 2,944,638 | 7/1960 | Rossman | 188—88 X |
| 3,371,960 | 3/1968 | Bayer et al. | 297—386 |
| 3,385,403 | 5/1968 | Lucien et al. | 188—88 |

JAMES T. McCALL, Primary Examiner

U.S. Cl. X.R.
188—88